(12) United States Patent
Eich

(10) Patent No.: US 8,657,095 B2
(45) Date of Patent: Feb. 25, 2014

(54) CONTROL DEVICE AND METHOD FOR CONTROLLING

(71) Applicant: Schaeffler Technologies AG & Co. KG, Herzogenaurach (DE)

(72) Inventor: Juergen Eich, Buehl (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 13/632,265

(22) Filed: Oct. 1, 2012

(65) Prior Publication Data

US 2013/0020168 A1 Jan. 24, 2013

Related U.S. Application Data

(63) Continuation of application No. PCT/DE2011/000317, filed on Mar. 24, 2011.

(30) Foreign Application Priority Data

Apr. 8, 2010 (DE) .......................... 10 2010 014 199

(51) Int. Cl.
*F16D 25/12* (2006.01)

(52) U.S. Cl.
USPC .............. 192/85.63; 701/67; 701/68; 701/36; 192/90; 192/84.6; 74/473.11; 74/473.12

(58) Field of Classification Search
None
See application file for complete search history.

(56) References Cited

U.S. PATENT DOCUMENTS

| 6,695,747 | B2* | 2/2004 | Zimmermann et al. ....... 477/123 |
| 6,785,599 | B2* | 8/2004 | Berger et al. .................... 701/51 |
| 7,367,923 | B2* | 5/2008 | Zenno et al. .................. 477/180 |
| 8,135,523 | B2 | 3/2012 | Panzer |
| 2003/0102196 | A1* | 6/2003 | Wetzel et al. ................ 192/48.2 |
| 2004/0188218 | A1* | 9/2004 | Berger et al. .................... 192/90 |
| 2005/0130800 | A1* | 6/2005 | Rieger et al. .................. 477/174 |
| 2005/0276876 | A1* | 12/2005 | Koetke et al. ................. 425/381 |
| 2006/0032721 | A1* | 2/2006 | Langwald ................... 192/85 C |
| 2009/0292432 | A1* | 11/2009 | Suzuki et al. ................... 701/68 |

FOREIGN PATENT DOCUMENTS

| DE | 19853333 | | 6/1999 |
| DE | 10065023 | | 7/2002 |
| DE | 10065023 A1 | * | 7/2002 |
| DE | 10209839 | | 9/2002 |
| DE | 10209839 A1 | * | 9/2002 |
| DE | 102008044823 | | 3/2009 |
| DE | 102008057656 | | 6/2009 |

* cited by examiner

*Primary Examiner* — Thomas Black
*Assistant Examiner* — Paul Castro
(74) *Attorney, Agent, or Firm* — Simpson & Simpson, PLLC

(57) ABSTRACT

The invention relates to a control device and to a method for controlling an automated clutch, which includes a hydraulic clutch actuating system, which has a hydrostatic actuator, which is driven by and electric-motor actuating drive having an incremental displacement sensor in such a way that the actuator moves in a translatable manner. The invention includes an absolute displacement sensor, which detects the actuator position.

8 Claims, 1 Drawing Sheet

CONTROL DEVICE AND METHOD FOR CONTROLLING

CROSS-REFERENCE TO RELATED APPLICATIONS

This application is filed under 35 U.S.C. §120 and §365(c) as a continuation of International Patent Application No. PCT/DE2011/000317, filed Mar. 24, 2011, which application claims priority from German Patent Application No. 10 2010 014 199.2, filed Apr. 8, 2010, which applications are incorporated herein by reference in their entireties.

FIELD OF THE INVENTION

The invention relates to a control device and a method for controlling an automated clutch that includes a hydraulic clutch actuating system with a hydrostatic actuator that is driven by an actuating drive in the form of an electric motor including an incremental displacement sensor in a way to cause the actuator to carry out a translatory movement.

BACKGROUND OF THE INVENTION

The published German Patent Application No. 10 2008 044 823 A1 discloses a method for controlling a friction clutch where the clutch travel distance is detected during actuation by incremental displacement sensors that count distance increments and can thus detect relative clutch travel and are calibrated for the detection of absolute clutch travel.

BRIEF SUMMARY OF THE INVENTION

An object of the invention is to determine an accurate position signal of the actuator in a simple way using a control device and/or a method.

In a control device for controlling an automated clutch that includes a hydraulic clutch actuating system with a hydrostatic actuator driven by an actuating drive in the form of an electric motor including an incremental displacement sensor in a way to cause the actuator to carry out a translatory movement, this object is attained by an absolute displacement sensor that detects the position of the actuator. The actuator is used to adjust a master cylinder piston in a master cylinder of the hydraulic clutch actuating system. Hydraulic clutch actuating systems, including an actuator, a master cylinder, a slave cylinder and a clutch are known, for example, from the published German Patent Application No. 10 2008 057 656 A1. The actuating drive in the form of an electric motor includes incremental displacement sensors for measuring the incremental displacement. However, the incremental displacement measurement does not allow the determination of sufficiently accurate conclusions on the position of the actuator. In fact, during operation, unnoticed positional changes may occur within a short period of time and may cause an intolerable displacement of the clutch and thus of the transmittable clutch torque, which may even result in safety-critical situations. Thus, in accordance with an essential aspect of the invention, in addition to an incremental distance measurement, which is also used for commutating the electric-motor actuating drive, an absolute displacement sensor is provided for detecting the position of the actuator.

In one embodiment of the control device, the electric-motor actuating drive is embodied as an electronically commutated DC motor and/or is coupled to the actuator via a threaded spindle with which the absolute displacement sensor may be associated. The threaded spindle is preferably a planetary roller spindle that is used to convert a rotary driving movement of the electric-motor actuating drive into a longitudinal movement of the actuator. An advantage of the planetary roller spindle is that it has a very high transmission ratio. However, the transmission behavior of the planetary roller spindle may be subject to slip, i.e., in some circumstances there may not be a constant transmission ratio between the rotary movement created by the electric-motor actuating drive on the drive side and the longitudinal movement on the power take-off side, i.e., the side of the master cylinder. Due to the arrangement of the absolute displacement sensor on the power take-off side, the master cylinder position may be reliably detected independently of any operational slip of the threaded spindle. The absolute displacement sensor is associated with the power take-off end of the threaded spindle/planetary roller spindle that carries out the longitudinal movement. The absolute displacement sensor may likewise be associated with a piston rod of a master cylinder piston or with the master cylinder piston itself.

In another embodiment, using the control device described above, in a method for controlling an automated clutch having a hydraulic clutch actuating system with a hydrostatic actuator that is driven by an actuating drive in the form of an electric motor including an incremental displacement sensor in a way to cause the actuator to carry out a translator movement, the object indicated above is attained by detecting the position of the actuator both in a relative way using the incremental displacement sensor and in an absolute way using the absolute displacement sensor. In a further aspect of the invention, the absolute displacement sensor may be a simple sensor that has a significantly lower degree of position resolution and accuracy than the incremental position measurement on the motor side. This may reduce costs.

In one embodiment of the method, at least one position signal of the incremental displacement sensor and at least one position signal of the absolute displacement sensor are superimposed. Due to its rather limited accuracy and resolution, the absolute displacement sensor on the power take-off side alone may not be sufficient to set the clutch torque with sufficient accuracy. Thus, in accordance with a further aspect of the invention, both position signals may be combined in order to determine a position signal that is suitable for the control of the clutch.

In another embodiment of the method, the two position signals are superimposed in a position model in such a way that a small-signal behavior, and if applicable, displacing movements within a short period of time is/are dominated by a high-resolution incremental displacement measurement of the incremental displacement sensor. Small modulatory movements as they may be necessary for the control of the clutch in certain situations can be implemented by the high-resolution incremental displacement measurement even though they are beyond the position resolution of the absolute displacement sensor on the power take-off side.

In yet another embodiment of the method, a lower-resolution absolute displacement measurement of the absolute displacement sensor is used as a reference measure for a large-signal behavior. A positional drifting of the threaded spindle that cannot be detected by the motor-side incremental displacement measurement may be avoided by including the absolute displacement sensor on the power take-off side. An avoidance of positional deviations also serves to protect the actuating system because the danger of undesired collisions with stops on the ends of the actuator displacement range is avoided. In addition, an absolute comparison or referencing of the incremental displacement measurement may be dispensed with.

In another embodiment of the method, with the aid of a scaling factor, a position increment of the incremental displacement sensor is converted into a displacement difference that is added to a current actuator position. The scaling factor preferably corresponds to a medium transmission of the threaded spindle.

In yet another embodiment of the method, a position signal of the absolute displacement sensor is coupled in. The position signal of the absolute displacement sensor is preferably coupled in via a separate path of the position model.

In another embodiment of the method, a dead zone is used as a non-linear transmission element for the position signal of the absolute displacement sensor. As a consequence, in case of small differences between the measured and calculated absolute positions, the determined displacement signal may be updated simply by adding up the motor-side position increments. This allows a fine-tuned adjustment of the actuator position and of the clutch torque in the small-signal behavior.

In yet another embodiment of the method, in case of a significant difference between the determined or current actuator position and the position signal of the absolute displacement sensor, a fault signal is fed back, for example, via a parametrizable feedback amplification. The value of the feedback amplification preferably specifies a time constant indicating how fast the positional deviation is to be reduced.

The automated clutch is preferably an automated double clutch associated with an automated manual transmission. The clutch, for example, a double clutch, is preferably directly actuated by the hydrostatic actuator, i.e., without any interconnected lever mechanisms.

BRIEF DESCRIPTION OF THE SEVERAL VIEWS OF THE DRAWINGS

The nature and mode of operation of the present invention will now be more fully described in the following detailed description of the invention taken with the accompanying drawing figures, in which.

DETAILED DESCRIPTION OF THE INVENTION

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and, as such, may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

Figure 1:
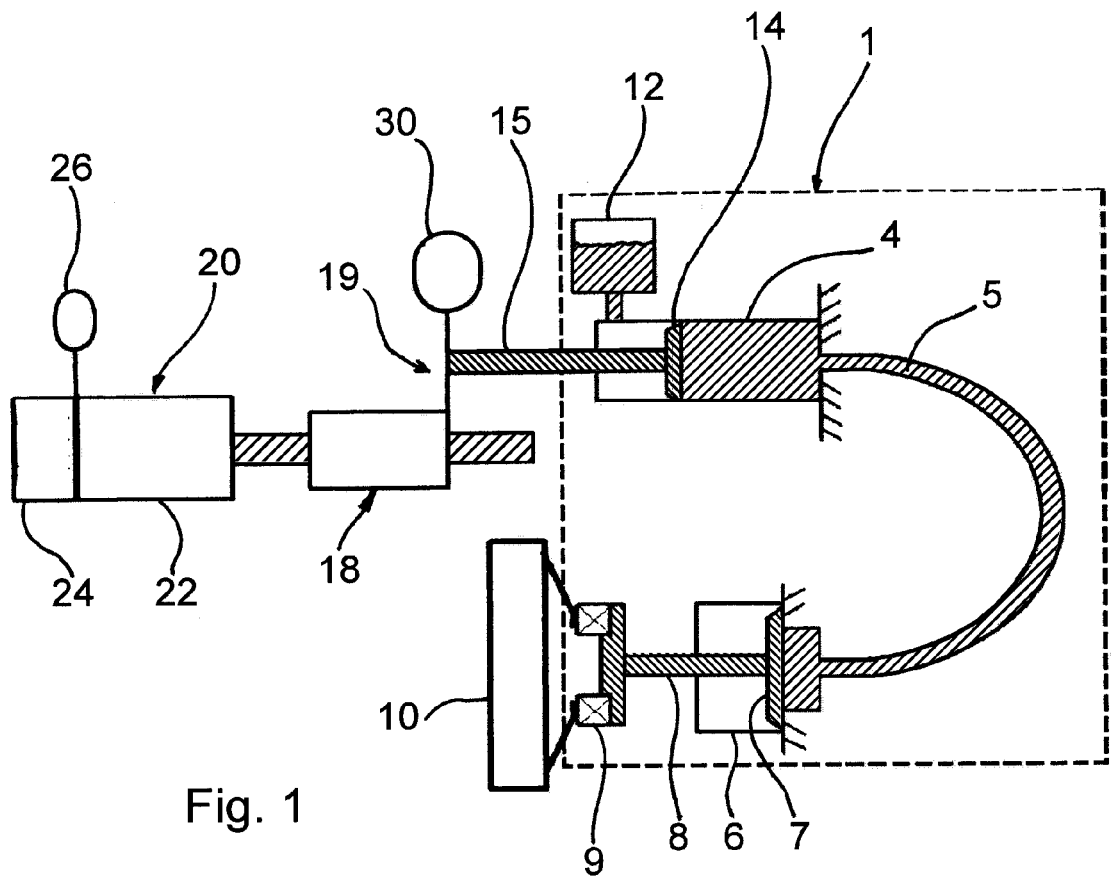
FIG. 1 is a simplified representation of a clutch actuating system for actuating an automated friction clutch; and, FIG. 2 is a block diagram indicating a position model for controlling the clutch.

FIG. 1 is a simplified representation of clutch actuating system 1 for friction clutch 10, for example, an automated double clutch. Clutch actuating system 1 is associated with friction clutch 10, embodied as a double clutch, in a drive train of a motor vehicle. Clutch actuating system 1 includes master cylinder 4 connected to slave cylinder 6 by hydraulic line 5, also referred to as a pressure line. Slave piston 7 is movable to and fro in slave cylinder 6. Slave piston 7 actuates friction clutch 10, embodied as a double clutch, via an actuating member, and preferably, an interposed bearing.

Master cylinder 4 is connectable to a compensation container via a connecting opening. Master piston 14 is movable to and fro in master cylinder 4. Piston rod 15, extending from master piston 14, is translatorily movable in the longitudinal direction together with master piston 14.

Piston rod 15 of master piston 14 is connected to actuating drive 20 in the form of an electric motor via threaded spindle 18 embodied as a planetary roller spindle. Actuating drive 20 in the form of an electric motor includes commutated DC motor 22 and control or control device 24. Incremental displacement measurement device 26 having at least one incremental displacement sensor is integrated in actuating drive 20 in the form of an electric motor.

Planetary roller spindle 18 is used to convert the rotary driving movement of DC motor 22 into a longitudinal movement of actuator 19, which includes a longitudinally movable part of planetary roller spindle 18 and/or piston rod 15, and as the case may be, master cylinder piston 14. The clutch is actuated in an automated way by DC motor 22 via threaded spindle 18, the actuator 19, master cylinder 4, and slave cylinder 6. In the actuation of the clutch, DC motor 22, which generates the rotary driving movement, represents the drive side and actuator 19, which carries out the longitudinal movement, represents the power take-off side.

In the context of the present invention it has been found that the transmission behavior of the clutch actuation is subject to slip, i.e., that there is no constant transmission ratio between the rotary movement on the drive side and the longitudinal movement on the power take-off side. Although it is possible to determine the approximate transmission ratio when planetary roller spindle 18 is constructed, the actual transmission ratio is variable and depends on complex influencing factors and is difficult to calculate using a model.

In terms of controlling actuator 19, this means that incremental displacement measurement 26 is not sufficient to draw sufficiently accurate conclusions on the position of actuator 19. Instead, undesired positional fluctuations within a short period of time during operation need to be reckoned with.

In one aspect of the invention, in addition to incremental displacement measurement 26, which is also used for the commutation of DC motor 22, absolute displacement sensor 30 is arranged on the power take-off side of planetary roller spindle 18. For cost-efficiency reasons, a simple sensor is used as absolute displacement sensor 30, which may have a significantly lower degree of position resolution and accuracy than drive-side incremental displacement measurement 26.

Due to its limited accuracy and resolution, absolute displacement sensor 30 provided on the power take-off side is not sufficient to be able to set the clutch torque with a sufficient degree of accuracy. Consequently, the position information of incremental displacement measurement 26 and of absolute displacement sensor 30 are superimposed in a way to ensure that a small-signal behavior and adjustment movements within a short period of time are dominated by high-resolution incremental displacement measurement 26, whereas the less accurate absolute displacement sensor 30 is used as a reference measure for the large-signal behavior.

Figure 2:
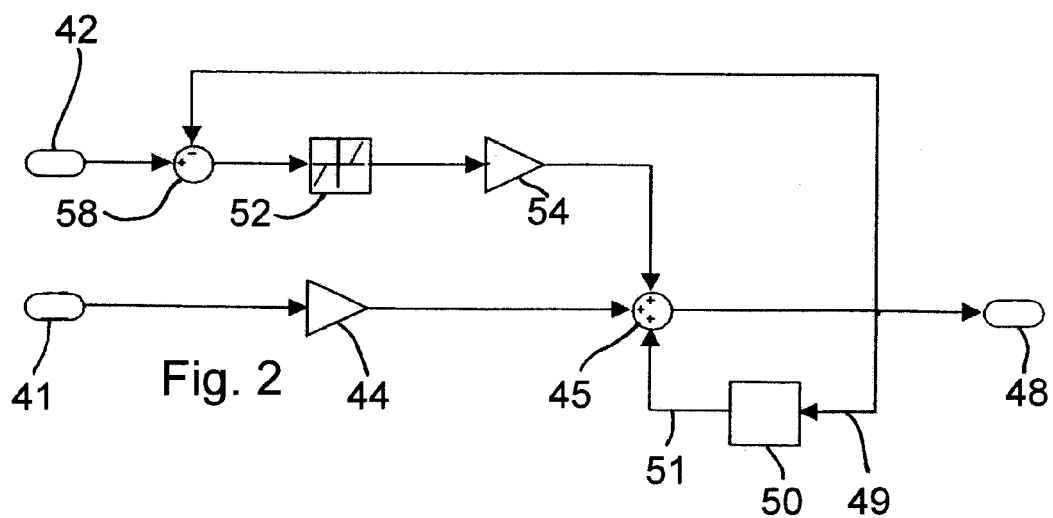

FIG. 2 represents a block diagram of a position model with two paths. The input signal of the lower path of FIG. 2 is position increment 41 of incremental displacement measurement 26 shown in FIG. 1. The input signal of the upper path of FIG. 2 is a position signal 42 of power take-off side absolute displacement sensor 30 of FIG. 1.

At first, we will examine the lower path of the block diagram. With the aid of scaling factor 44 corresponding to a medium transmission of planetary roller spindle 18 of FIG. 1, position increments 41 of the electric motor are converted into displacement differences that are added to current actuator position 51 at summation point 45. Arrows 49 and 51 indicate that actuator position 48 is passed over delaying block 50. This means that summand 51 corresponds to detected actuator position 48 of the previous calculation step.

To avoid positional drifting caused by planetary roller spindle 18, position signal 42 of the power take-off side is coupled in via the upper path in FIG. 2. Globally, power take-off side signal 42 acts as a command variable in a control loop from which the controlled or actual variable 48 is subtracted and is then fed back via a non-linear approach as correcting variable. Dead zone 52 is particularly suitable as a non-linear transmission element. In case of small deviations between position signal 42 and model position 48, no corrections are made due to dead zone 52. Determined displacement signal 48 is then updated exclusively by adding motor-side position increments 41. This enables a fine-tuned adjustment of the actuator position and of the clutch torque in the small-signal behavior.

However, if there are greater significant differences between position signal 42 and the model position or previous actuator position 48, a fault signal is fed back from dead zone 52 via feedback point 58 and parameterizable feedback amplification 54 to model position 48. The value of feedback amplification 54 specifies a time constant indicating how fast the positional deviation is to be reduced. In practice, this time constant is specified as a function of the slip of planetary roller spindle 18 and the resultant drifting speed. Moreover, the correction behavior is defined by the width of dead zone 52, which must be geared to the resolution and accuracy of power take-off side absolute displacement sensor 30 and to the requirements for the absolute accuracy of the clutch torque.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

LIST OF REFERENCE NUMERALS 1 clutch actuating system
4 master cylinder
5 hydraulic line
6 slave cylinder
7 slave piston
8 actuating member
9 bearing
10 friction clutch
12 compensation container
14 master piston
15 piston rod
18 planetary roller spindle
19 actuator
20 electric-motor actuating drive
22 DC motor
24 control
26 incremental displacement sensor
30 absolute displacement sensor
41 position increment
42 position signal
44 scaling factor
45 summation point
48 currently detected actuator position
49 currently detected actuator position
50 delaying block
51 last detected actuator position
52 dead zone
54 feedback amplification
58 feedback point

What is claimed is:

1. A control device for controlling an automated clutch, comprising:
a hydraulic clutch actuating system having:
a master cylinder including a master piston and a piston rod;
a threaded spindle engaged with the piston rod;
an actuator arranged to displace the threaded spindle in a longitudinal direction to displace the piston rod in the longitudinal direction;
an electric motor actuating drive arranged to provide an actuating force to displace the actuator in the longitudinal direction, and including an incremental displacement sensor;
an absolute displacement sensor, separate from the incremental displacement sensor, and arranged to measure a position of the actuator; and,
a control device configured to control a position of the actuator by combining:
a first signal corresponding to a previously detected position of the actuator;
a second signal corresponding to position increments from the incremental displacement sensor; and,
a third signal from the absolute displacement sensor.

2. The control device recited in claim 1, wherein the electric-motor actuating drive is embodied as an electronically commutated DC motor.

3. The control device recited in claim 1, wherein the electric-motor actuating drive is embodied as an electronically commutated DC motor and is coupled to the actuator via the threaded spindle.

4. A method for controlling an automated clutch including an electric motor with an incremental displacement sensor, a master cylinder with a master piston and a piston rod, an actuator engaged with the piston rod, a threaded spindle engaged with the piston rod, an absolute displacement sensor, and a control system, comprising:
displacing the actuator with the electric motor;
rotating the threaded spindle with the actuator;
displacing the threaded spindle in a longitudinal direction;
displacing the piston rod in the longitudinal direction with the threaded spindle;
detecting a relative position of the actuator using the incremental displacement sensor;
detecting an absolute position of the actuator using the absolute displacement sensor;
combining, with the control system:
a first signal corresponding to a previously detected position of the actuator;

a second signal corresponding to position increments from the incremental displacement sensor; and,
a third signal from the absolute displacement sensor; and,
controlling, with the control system and the combined first, second, and third signals, a position of the actuator.

5. The method recited in claim 4, wherein the second and third signals are superimposed in a position model in such a way that a small-signal behavior and adjusting movements in a short period of time are dominated by a high-resolution incremental displacement measurement of the incremental displacement sensor.

6. The method recited in claim 5, wherein an absolute displacement measurement of lower resolution taken by the absolute displacement sensor is used as a reference measure for a large-signal behavior.

7. The method recited in claim 4, wherein a position increment of the incremental displacement sensor is converted into a displacement difference with the aid of a scaling factor and wherein the displacement difference is added to a currently determined actuator position with the aid of a scaling factor.

8. A method for controlling an automated clutch including an electric motor with an incremental displacement sensor, a master cylinder with a master piston and a piston rod, an actuator engaged with the piston rod, a threaded spindle engaged with the piston rod, an absolute displacement sensor, and a control system, comprising:
  displacing the actuator with the electric motor;
  rotating the threaded spindle with the actuator;
  displacing the threaded spindle in a longitudinal direction;
  displacing the piston rod in the longitudinal direction with the threaded spindle;
  detecting a relative position of the actuator using the incremental displacement sensor;
  detecting an absolute position of the actuator using the absolute displacement sensor;
  generating a first signal by subtracting a second signal corresponding to a control variable for the actuator from a third signal from the absolute displacement sensor;
  forming the control variable by combining, with the control system:
    the first signal;
    a fourth signal corresponding to a previously detected position of the actuator; and,
    a fifth signal corresponding to position increments from the incremental displacement sensor; and,
  controlling, with the control system and the combined first, second, and third signals, a position of the actuator.

* * * * *